(12) United States Patent
Böhm et al.

(10) Patent No.: US 7,159,445 B2
(45) Date of Patent: Jan. 9, 2007

(54) SNIFFING LEAK DETECTOR AND METHOD FOR OPERATION THEREOF

(75) Inventors: Thomas Böhm, Cologne (DE); Gerhard Küster, Cologne (DE); Jörn Liebich, Cologne (DE); Randolf-Paul Rolff, Kerpen (DE)

(73) Assignee: Inficon GmbH (DE)

( * ) Notice: Subject to any disclaimer, the term of this patent is extended or adjusted under 35 U.S.C. 154(b) by 48 days.

(21) Appl. No.: 10/481,678

(22) PCT Filed: Jun. 25, 2002

(86) PCT No.: PCT/EP02/06986

§ 371 (c)(1),
(2), (4) Date: May 21, 2004

(87) PCT Pub. No.: WO03/008923

PCT Pub. Date: Jan. 30, 2003

(65) Prior Publication Data

US 2004/0194533 A1 Oct. 7, 2004

(30) Foreign Application Priority Data

Jul. 13, 2001 (DE) .................. 101 33 567

(51) Int. Cl.
*G01N 33/00* (2006.01)
*G01N 1/24* (2006.01)

(52) U.S. Cl. .............. 73/23.2; 73/31.03; 73/31.05; 73/864.34

(58) Field of Classification Search .............. 73/23.2, 73/23.21, 23.3, 23.31, 23.34, 31.03, 31.05, 73/40, 40.7, 864.34
See application file for complete search history.

(56) References Cited

U.S. PATENT DOCUMENTS

| 3,645,127 | A | | 2/1972 | Mongodin et al. |
| 6,075,445 | A | * | 6/2000 | McLoughlin et al. ....... 340/586 |
| 6,085,576 | A | * | 7/2000 | Sunshine et al. .......... 73/29.01 |
| 6,179,444 | B1 | | 1/2001 | Plesko |
| 6,229,301 | B1 | * | 5/2001 | Bolli et al. ............. 324/207.21 |
| 6,411,207 | B1 | * | 6/2002 | Shaffer ....................... 340/521 |
| 2002/0058459 | A1 | * | 5/2002 | Holt ........................... 446/484 |

FOREIGN PATENT DOCUMENTS

| DE | 24 41 124 | 3/1976 |
| DE | 32 47 975 | 6/1984 |
| DE | 38 01 893 | 2/1989 |
| DE | 199 11 260 | 9/2000 |
| GB | 1 489 953 | 10/1977 |
| GB | 2 072 852 | 10/1981 |
| JP | 62025229 | 2/1987 |
| WO | 00/55603 | 9/2000 |

OTHER PUBLICATIONS

Definition of "record" from Merriam-Webster Online Dictionary, http://www.m-w.com.*
Definition of "sensor" from Merriam-Webster Online Dictionary, http://www.m-w.com.*

* cited by examiner

*Primary Examiner*—Daniel S. Larkin
(74) *Attorney, Agent, or Firm*—Peter J. Bilinski

(57) ABSTRACT

A sniffing leak detector includes a handpiece, supporting a sniffing tip, the detector further including a gas sensor. To promote longer life and obtaining more accurate results, the leak detector is equipped with an acceleration sensor for recording the movements of the handpiece.

10 Claims, 2 Drawing Sheets

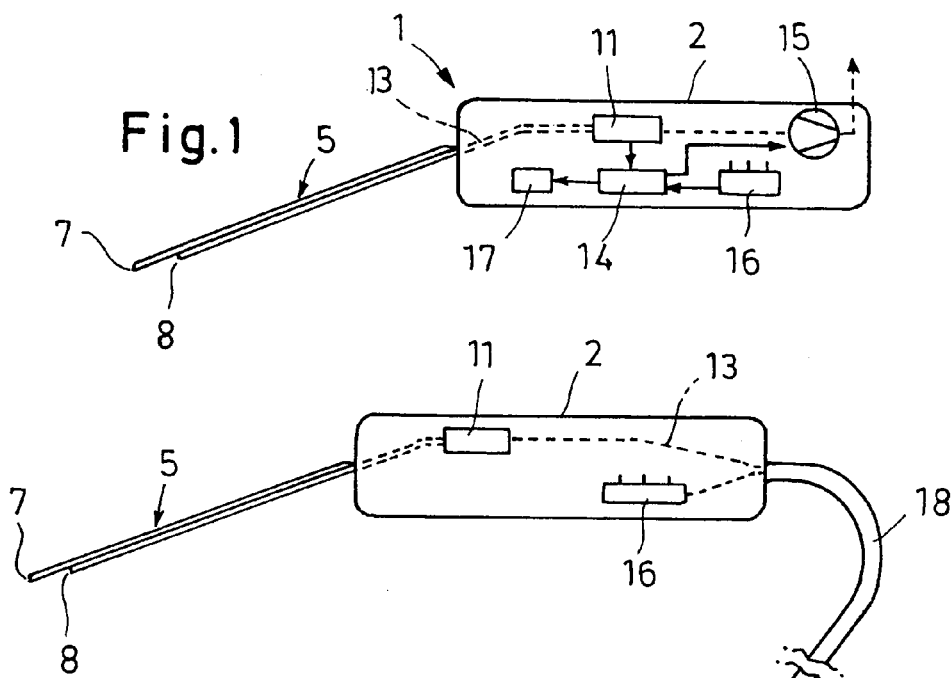
Fig.1
Fig.2
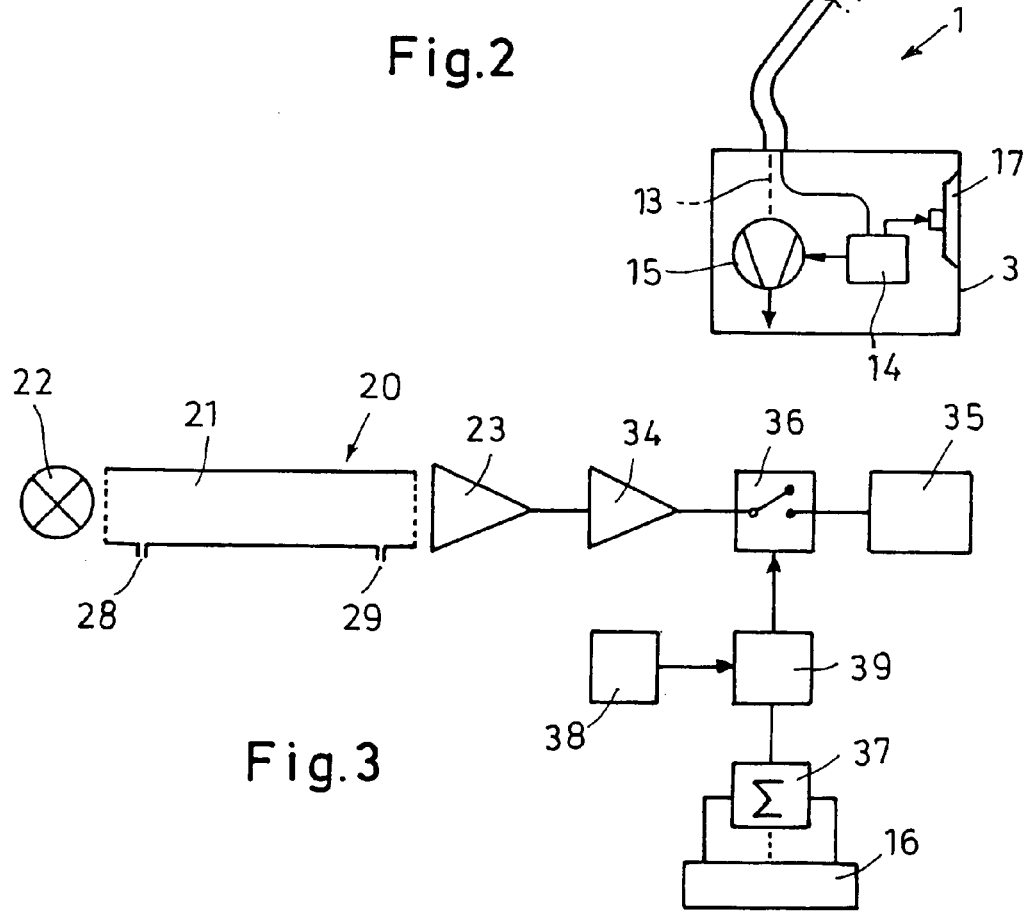
Fig.3

SNIFFING LEAK DETECTOR AND METHOD FOR OPERATION THEREOF

FIELD OF THE INVENTION

The present invention relates to a sniffing leak detector as well as methods for operating leak detectors of this kind.

BACKGROUND OF THE INVENTION

Leak detectors with sniffing facilities are known (c.f., for example, DE-A 24 41 124 and DE-A 199 11 260). In the instance of sniffing leak detection, a unit under test containing a test gas is scanned with the aid of a sniffing tip. If a leak is present, test gas will escape to the outside. It is then supplied by the sniffing tip to a gas detector or gas sensor. The signals produced by the gas detector serve, among other things, the generation of alarm signals, preferably of the acoustic type. Frequently, helium serves as the test gas. Also a working gas present in any case within the unit under test may be employed as the test gas, in cooling facilities a halogen gas, for example.

SUMMARY OF THE INVENTION

It is the objective of the present invention to improve several aspects of a leak detector of the kind affected here, as well as the leak detection methods performed with such a leak detector.

In the instance of a leak detector of the typical kind, this objective is attained by equipping it with an acceleration sensor. This acceleration sensor may, for example, serve the purpose of letting the leak detector instrument enter the standby mode when not in use and "waking up" it upon use. An other possibility of employing the acceleration sensor is the suppression of interfering signals from a gas sensor being sensitive to movements.

While operating, sniffing leak detectors must not necessarily be operated by a keyboard. Therefore, previously, switching over of leak detectors to a standby mode was effected only manually. This type of switchover is inconvenient and is either forgotten by the user or deliberately not performed. By accommodating, in accordance with the present invention, an acceleration sensor in the sniffing facility at the connecting line, for example, or preferably in the handpiece, the instrument itself is capable of detecting whether the user is performing a sniffing leak detection process or if he has deposited the handpiece. With the handpiece deposited, the instrument automatically switches to the desired standby mode. The advantages of this mode—increased service life, energy-saving etc.—can be utilised.

It is especially expedient, when during the standby mode not the entire power supply voltage is switched off, but instead only the gas supply pump through which the measurement gas is taken in is switched off when the handpiece is not moved for a longer period of time. In this manner not only the service life of the pump but also that of the detection sensor system which is susceptible to contamination and the filters through which the measurement gas flows, can be increased. Since during the standby mode the sensor system and the electronics are not switched off, the leak detector will be immediately ready for operation as soon as the handpiece is moved once more.

In the instance of sniffing leak detectors it is known to accommodate the gas sensor in the handpiece itself, so as to attain short response times. This applies in particular to sniffing leak detectors which consist of the handpiece and a supply unit separated therefrom. The connecting line extending between the handpiece and the supply unit needs to be relatively long (5 m, for example), so that pumping of the measurement gas from the sniffing tip to the supply unit would take up a relatively long time. If the gas sensor is of the type being sensitive to movements (for example, an infrared sensor as it is known from DE-A-199 11 260), the movement of the handpiece causes interfering signals which may result in incorrect measurement results. By employing an acceleration sensor, such interfering signals can be detected and, for example, suppressed. This may be implemented in the simplest case, by interrupting the measurement signal line as soon as signals are produced by the movement sensor. Through these measures the process of sniffing leak detection is rendered more simple and more reliable.

BRIEF DESCRIPTION OF THE DRAWINGS

Further advantages and details of the present invention shall be explained with reference to the examples of embodiments depicted in drawings 1 to 5.

FIGS. 1 and 2 schematically represent leak detectors of the kind affected herein; and FIGS. 3 to 5 block diagrams for solutions serving the purpose of suppressing interfering signals in the instance of employing gas sensors being sensitive to movements.

DETAILED DESCRIPTION

Figure 4:
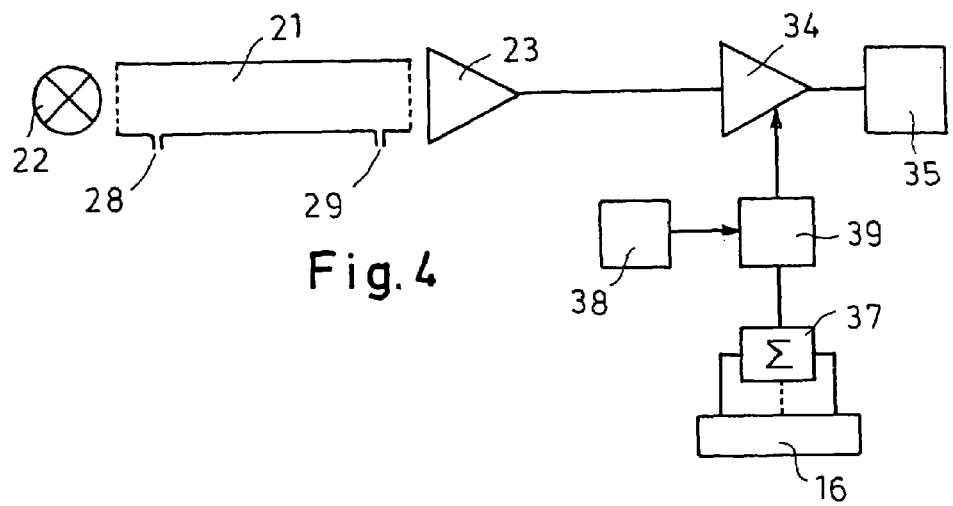

In the drawing FIGS. 1 and 2 the leak detector is designated as 1 and the handpiece as 2. The handpiece 2 carries a sniffing tip 5. This is equipped with two gas inlet apertures 7 and 8 at different locations. Gas inlet aperture 7 is located in the end section of sniffing tip 5 at the front. It serves the purpose of accepting the measurement gas which in the case of a leak contains the test gas. Through the gas inlet aperture 8, reference gas from the vicinity of the unit under test, not depicted, is taken in for the purpose of taking into account test gas backgrounds.

The solutions according to drawing FIGS. 1 and 2 differ in that in the instance of the embodiment in accordance with drawing FIG. 1, all components of the leak detector 1 are accommodated in the handpiece 2 itself, whereas in the instance of the embodiment in accordance with drawing FIG. 2, a handpiece 2 and a therefrom separated supply unit 3 is provided.

The gas sensor 11 is located in handpiece 2. The gas which is to be analysed for the presence of the test gas is sucked in with the aid of a supply pump 15 and supplied to the gas sensor 11 (dashed lines 13). In the solution in accordance with drawing FIG. 1, the supply pump 15 is located in the handpiece 2, in the solution in accordance with drawing FIG. 2 it is accommodated in a separate supply unit 3. Moreover, the acceleration sensor 16 is located in handpiece 2. Said acceleration sensor supplies its signals to a supply, measurement and a display circuit 14 depicted by way of a single block, which in the instance of the solution in accordance with drawing FIG. 1 is accommodated in the handpiece 2, and which in the instance of the solution in accordance with drawing FIG. 2 is accommodated in the supply unit 3. A loudspeaker 17 is depicted as an example for an alarm indicator. It receives its signals from block 14 and may also be accommodated in handpiece 2 (drawing FIG. 1) or in the supply unit 3 (drawing FIG. 2).

Also the supply pump 15 is linked in the instance of both embodiments with the block 14. Via this link the supply pump may be switched off and thus the leak detector switched to the desired standby mode when the handpiece has been deposited, and as long as the acceleration sensor does not supply any signals during a pre-selected period of time.

In the solution in accordance with drawing FIG. 2, the handpiece 2 and the supply unit 3 are linked by a line 18. Depending on the distribution of the individual components in the handpiece 2 and in the supply unit 3, the line 18 comprises electrical and/or gas carrying lines.

Figure 5:
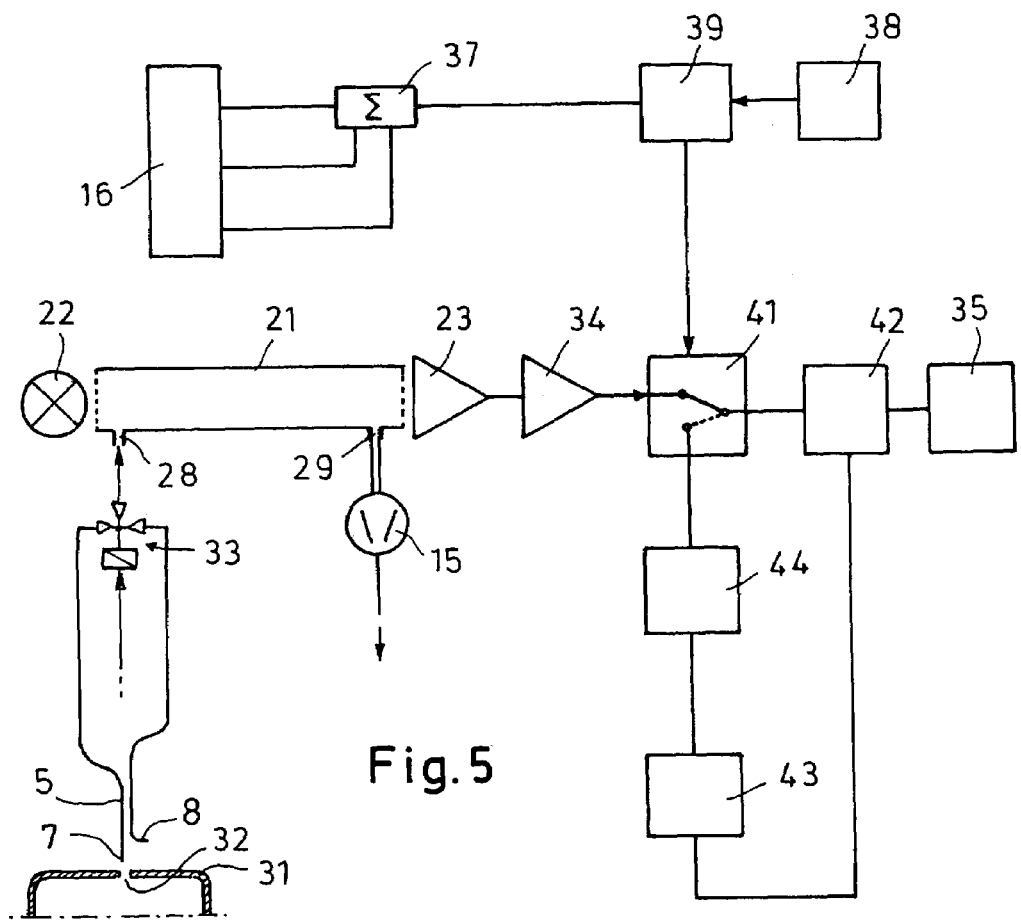

With reference to the drawing FIGS. 3 to 5 it shall be explained how with the aid of the acceleration sensor 16 signals suffering interference due to movements of the handpiece 2 can be suppressed. An infrared sensor 20 is depicted schematically as an example for a gas detector which is sensitive to movements. It comprises a cell 21 to which there is assigned on one face side an infrared light source 22, and on its other face side an infrared light detector 23. Whilst performing the leak detection process, gas flows through cell 21. The connections in the area of the two face sides are designated as 28 and 29.

Drawing FIG. 5 depicts an example for the means of producing the gas flow in the cell 21 (cf. also German patent application 100 62 126.0). With the aid of the gas supply pump 15 which is linked to the connection 29 of the cell 21, measurement gas and reference gas are taken in through the sniffing tip 5 with its gas inlet apertures 7 and 8. The schematically depicted unit under test 31 exhibits a leak 32 so that test gas is contained in the measurement gas. A control valve 33 serves the purpose of alternately supplying the measurement gas and the reference gas to the cell 21. The pump 15 defines the velocity at which these gases flow axially through the cell 21. An amplifier 34 is connected to the infrared light detector 23. An indicator (acoustic, optical) is designated as 35.

In the instance of performing sniffing leak detection on a unit under test, locations where a leak is suspected (soldered joints, connections etc.) are scanned one after the other with the sniffing tip 5 of the handpiece 2. During this scanning phase the handpiece is moved relatively slowly. The signals delivered by the gas sensor are not impaired. The acceleration sensor provides no or only negligibly small signals. The signals delivered by the infrared light detector 23 shall not be suppressed. If a leak is present, the signals reaching the indicator 35 provide, preferably, the acoustic alarm.

When moving the sniffing tip 5 from one location suspected of having a leak to a different location or to its rest, the handpiece is commonly moved relatively fast. Alone the interfering signals supplied by the gas sensor which is sensitive to movements can cause an alarm although no leak was determined. Interfering signals of this magnitude shall be suppressed. In this it is expedient to define a limit value and to select this limit value depending on the sensitivity desired for the leak detection process. If, for example, it is demanded that in the instance of units under test all leaks exceeding 3 gram per year shall be indicated, then it will suffice to suppress only such interfering signals which would supply an indication exceeding 3 g/yr.

The simplest means of suppressing interfering signals is to switch these off. Drawing FIG. 3 depicts an example of such an embodiment. A, preferably, electronic switch 36 is located between the amplifier 34 and the indicator 35. The signals supplied by the acceleration sensor 16 being sensitive in two or three axes are initially supplied to a summing stage 37. As soon as the signals supplied by the summing stage 37 exceeded a certain value, the path of the measurement signal between detector 23 and indicator 35 is interrupted. The limit value is set up in block 38 which in block 39 between stage 37 and switch 36 defines a threshold.

In the solution in accordance with drawing FIG. 4, the signals supplied by block 39 influence the amount of gain in the path of the measurement signal. The signals from block 39 are supplied to the amplifier 34 and effect a significant reduction in the gain factor.

In the embodiment in accordance with drawing FIG. 5, the signals supplied by the acceleration sensor 16 are supplied to a changeover switch 41. As long as signals of this kind do not reach the changeover switch 41, the changeover switch 41 assumes the position indicated by the solid line. The measurement signals of the infrared light detector 23 arrive at indicator 35. If signals from the acceleration sensor 16 caused by movements of the handpiece 2 arrive at the changeover switch 41, it switches to the position indicated by the dashed line, before measurement signals of detector 23 suffering interference can arrive at the indicator.

Through the solution in accordance with drawing FIG. 5 it shall be achieved, that brief interruptions in the path of the measurement signal are not noted and longer interruptions are initially not noted by the user. The means proposed to this end comprise blocks 42, 43 and 44. Block 42 is located between the changeover switch 41 and the indicator 35. Said block has the function of a filter and, if required, that of a lock-in logic circuit. It is linked to block 43 which has the task of simulating a measurement signal. After switch 41 has switched over to the position indicated by the dashed line the signals simulated by building block 43 and which correspond to the signals provided by the preceding measurement signals pass via building block 42 to indicator 35. In the instance of short, hasty movements of the handpiece 2 the measured values are indicated continuously. By employing a lock-in amplifier it is possible to simulate, for example, the not yet demodulated sinusoidal signal whereby the indicated value is taken as a reference.

If the acceleration sensor 16 supplies signals over a prolonged period of time, meaning that the switch 41 assumes the position indicated by the dashed line for a longer period of time, then it is expedient to let the simulated signals decay slowly, preferably at such a speed with which also the measurement signal indicator decays upon terminating a leak search. Block 44 being located between block 43 and the changeover switch 41, has the function of a timer logic suited for this purpose.

Circuit blocks having certain functions are depicted in the drawing FIGS. 1 to 4. Many parts of the circuit may also be implemented with the aid of a microcomputer with suitable software.

The invention claimed is:

1. A sniffing leak detector for detecting whether a unit under test and containing a test gas is leaking, said leak detector comprising:
    a handpiece,
    a sniffing tip supported by said handpiece,
    a supply pump configured for sucking gases into said sniffing tip from a unit under test containing a test gas,
    a gas sensor that receives said gases from said sniffing tip and determines the presence of a leak in said unit, said gas sensor producing measurement signals indicative of a leak,
    an acceleration sensor accommodated in relation to said handpiece, said acceleration sensor being sensitive to movements of the handpiece and producing signals based upon the movements of the handpiece, and
    an electronic circuit that receives signals from the acceleration sensor, wherein the signals of the acceleration sensor are employed by the electronic circuit for the purpose of switching the leak detector to a standby mode after a predefined period of time during which the handpiece is not being utilized and in which any signals received from the acceleration sensor are employed by the electronic circuit for the purpose of automatically switching the leak detector from said standby mode to an operating mode.

2. A leak detector according to claim 1, said acceleration sensor is sensitive to movements with respect to at least two axes.

3. A leak detector according to claim 1, wherein the supply pump is located within the handpiece.

4. A leak detector according to claim 1, wherein a supply unit is provided separately from the handpiece, said handpiece and supply unit being linked by a connecting line and wherein the acceleration sensor is located in one of the handpiece and in the vicinity of the handpiece at the connecting line.

5. A leak detector according to claim 1, further including switching means, said switching means consisting at least partially of a microcomputer having suitable software.

6. A sniffing leak detector for detecting whether a unit under test and containing a test gas is leaking, said leak detector comprising:
 a handpiece,
 a sniffing tip supported by said handpiece,
 a supply pump configured for sucking gases into said sniffing tip from a unit under test containing a test gas,
 a gas sensor that receives said gases from said sniffing tip and determines the presence of a leak in said unit, said gas sensor producing measurement signals indicative of a leak,
 an acceleration sensor accommodated in relation to said handpiece, said acceleration sensor being sensitive to movements of the handpiece and producing signals based upon the movements of the handpiece, and
 an electronic circuit that receives signals from the acceleration sensor for switching the detector to a standby mode when the handpiece is not being utilized and in which any signals received from the acceleration sensor are employed by the electronic circuit for the purpose of automatically switching the leak detector from said standby mode to an operating mode, wherein only the supply pump is switched off when a predefined time period is reached in which the acceleration sensor does not receive signals indicative of movement of said handpiece while said detector is in the standby mode.

7. A sniffing leak detector for detecting whether a unit under test and containing a test gas is leaking, said leak detector comprising:
 a handpiece,
 a sniffing tip supported by said handpiece,
 a supply pump configured for sucking gases into said sniffing tip from a unit under test containing a test gas,
 a gas sensor that receives said gases from said sniffing tip and determines the presence of a leak in said unit, said gas sensor producing measurement signals indicative of a leak, said gas sensor being sensitive to movements and being one of an infrared sensor and a pyroelectric sensor, said gas sensor providing said measurement signals along a measurement signal lines,
 an acceleration sensor accommodated in relation to said handpiece, said acceleration sensor being sensitive to movements of the handpiece and producing signals based upon the movements of the handpiece, and
 an electronic circuit that receives signals from the acceleration sensor wherein for the period of time in which said acceleration sensor supplies signals indicative of handpiece movement, the measurement signal line is interrupted.

8. A detector according to claim 7, wherein said electronic circuit includes means for comparing the signals from said acceleration sensor to a limit value and interrupting said signal line if the signals exceed the limit value.

9. A leak detector according to claim 7, wherein for the period of time during which the acceleration sensor supplies signals indicative of handpiece movement, the gain factor in the measurement signal line is reduced, wherein the electronic circuit includes means for comparing the signals from said acceleration sensor to a limit value and reducing the gain factor in the measurement signal line if the limit value is exceeded.

10. A leak detector according to claim 7, wherein for the period during which the acceleration sensor supplies signals indicative of handpiece movement, a switch in the measurement signal line is actuated which for this period of time switches over to a generator providing a signal simulating the measurement signal.

* * * * *

UNITED STATES PATENT AND TRADEMARK OFFICE
CERTIFICATE OF CORRECTION

| | |
|---|---|
| PATENT NO. | : 7,159,445 B2 |
| APPLICATION NO. | : 10/481678 |
| DATED | : January 9, 2007 |
| INVENTOR(S) | : Thomas Böhm et al. |

It is certified that error appears in the above-identified patent and that said Letters Patent is hereby corrected as shown below:

In the Claims, relating to Claim 7, Column 6, Line 17. The word "lines," is incorrect and should be replace with --line,--.

Signed and Sealed this

Tenth Day of April, 2007

JON W. DUDAS
*Director of the United States Patent and Trademark Office*